(12) United States Patent
Chen et al.

(10) Patent No.: US 8,184,455 B2
(45) Date of Patent: May 22, 2012

(54) POWER ADAPTER HAVING POWER FACTOR CORRECTION CIRCUIT, SWITCH VOLTAGE REGULATION CIRCUIT AND VOLTAGE STABILIZATION CIRCUIT CONTROLLED BY FEEDBACK SIGNAL

(75) Inventors: Qiaoliang Chen, Xian Shaanxi (CN);
Ming Xu, Blacksburg, VA (US);
Yongjiang Bai, Xian Shaanxi (CN)

(73) Assignee: FSP Technology Inc., Taoyuan, Taoyuan Hsien (TW)

( * ) Notice: Subject to any disclaimer, the term of this patent is extended or adjusted under 35 U.S.C. 154(b) by 646 days.

(21) Appl. No.: 12/346,356

(22) Filed: Dec. 30, 2008

(65) Prior Publication Data
US 2010/0165684 A1    Jul. 1, 2010

(51) Int. Cl.
*H02M 3/335* (2006.01)
*H02M 7/44* (2006.01)
*G05F 5/00* (2006.01)
*H02M 1/10* (2006.01)

(52) U.S. Cl. .............................. 363/16; 363/98; 323/207
(58) Field of Classification Search .................... 363/15, 363/16, 97, 98, 89, 142, 21.02; 323/205, 323/207
See application file for complete search history.

(56) References Cited

U.S. PATENT DOCUMENTS

| | | | | |
|---|---|---|---|---|
| 5,691,889 A * | 11/1997 | Bazinet et al. | ................... | 363/89 |
| 6,115,276 A * | 9/2000 | Mao | ............................... | 363/127 |
| 6,297,972 B1 * | 10/2001 | Chen | ............................... | 363/37 |
| 6,683,798 B2 * | 1/2004 | Matsuura et al. | ............... | 363/17 |
| 7,151,678 B2 * | 12/2006 | Booth | ............................. | 363/15 |
| 7,173,833 B2 * | 2/2007 | Lin et al. | ......................... | 363/65 |
| 7,200,013 B2 * | 4/2007 | Gan et al. | .................... | 363/21.04 |
| 7,312,538 B2 * | 12/2007 | May | ............................... | 307/31 |
| 7,532,493 B2 * | 5/2009 | Lou et al. | ......................... | 363/65 |
| 7,848,117 B2 * | 12/2010 | Reinberger et al. | .............. | 363/16 |

* cited by examiner

*Primary Examiner* — Gary L Laxton
*Assistant Examiner* — Zekre Tsehaye
(74) *Attorney, Agent, or Firm* — Winston Hsu; Scott Margo

(57) ABSTRACT

A power adapter to receive at least one AC input power and transform to DC primary output power includes a power factor correction circuit to receive the AC input power and modulate to become a modulated power, an isolation voltage step-down circuit connecting to the power factor correction circuit to modulate the modulated power to a modulated lower voltage power, a switch voltage regulation circuit connecting to the isolation voltage step-down circuit to receive the modulated lower voltage power, and a voltage stabilization circuit connecting to the switch voltage regulation circuit. The switch voltage regulation circuit sets a determined output level and regulates the modulated lower voltage power to become a determined power at the determined output level. The voltage stabilization circuit modulates the determined power to become the primary output power and supplies the primary output power to a primary output end.

13 Claims, 8 Drawing Sheets

POWER ADAPTER HAVING POWER FACTOR CORRECTION CIRCUIT, SWITCH VOLTAGE REGULATION CIRCUIT AND VOLTAGE STABILIZATION CIRCUIT CONTROLLED BY FEEDBACK SIGNAL

FIELD OF THE INVENTION

The present invention relates to a power adapter and particularly to a power adapter to receive AC and DC input power to transform into at least one output power.

BACKGROUND OF THE INVENTION

With increasing growth of mobile information products (such as laptops, PDAs, mobile phones and the like), the demands for lower cost and miniaturized power supply and charging devices also increases constantly. Almost every country and designers and producers have announced specifications regarding energy saving and miniaturization of the power supply (and charge) equipments. Design of power adapters also has to focus the goal of higher transformation efficiency and lower power loss.

Referring to FIG. 1 for a conventional power adapter, take one with power greater than 75 watts as an example. It includes at least a power factor correction circuit 1 to transform AC to DC and a voltage transformation output circuit 8 connecting to the power factor correction circuit 1. The power factor correction circuit 1 is connected to an AC input end 101 to receive AC input power. The power factor correction circuit 1 increases the power factor of the input power and sends to the voltage transformation output circuit 8 for modulation to become primary output power. Hence, a first stage on the power factor correction circuit 1 make output of the power adapter coinciding with a resonant specification, and a second stage on the voltage transformation output circuit 8 make output voltage matching a connected electric device. Automobiles or airplanes usually provide DC power (generally between 11V and 16V). In order to adapt the DC power input in the environments set forth above, an extra voltage boosting DC/DC converter 9 is needed to boost the DC power to a determined voltage. As shown in FIG. 1, the DC/DC converter 9 is connected to a DC input end 102 to receive DC input power. The DC/DC converter 9 has a rear end connected to a primary output end 103 in parallel with the voltage transformation output circuit 8. The AC and DC input power are modulated through the power factor correction circuit 1, the voltage transformation output circuit 8 or the DC/DC converter 9 to become the primary output power sent to the primary output end 103. Moreover, to equip the power adapter with more functions, the primary output end 103 can be coupled in parallel with a voltage reducing modulation circuit 5 as a third stage to receive the primary output power and modulate to secondary output power at a lower voltage sent to a low voltage output end 104 so that the power adapter can be used on an electric device of a lower determined voltage.

The total conversion efficiency of the adapter is the multiplication result of the conversion efficiency of every stage. To increase the total conversion efficiency, the circuit of each stage has to run at an optimal operation point. The circuit configuration of the adapter has a significant impact to enhancement of the conversion efficiency. For a multi-stage power transforming circuit, the efficiency can be improved if the circuit of each stage merely executes one simple function (such as isolation or modulation). The circuit of each stage can function at an optimum operation point to reach the optimum highest efficiency. From this view of point, there are still improvement rooms for the conventional circuit shown in FIG. 1.

In recent years, power conversion circuits for medium or lower power often adopt a resonant circuit of a higher efficiency. Taking a LLC resonant circuit as an example, it has several advantages of higher conversion efficiency and zero voltage switching. However, the LLC resonant circuit is quite complex and costly for high frequency and high output current application with synchronous rectification technique.

Moreover, the present energy-saving regulations have a mandatory requirement regarding power loss in light load case. In this case switch loss occupies a great portion of total power loss. In the conventional techniques, the power adapter will enter a burst mode a portion to skip the duty period in light load case, hence switch loss is reduced. Such an energy-saving approach makes more energy saving possible.

In short, on the conventional power adapter there are still rooms for improvement in terms of enhancing conversion efficiency, especially on power circuit configuration and light load energy saving.

SUMMARY OF THE INVENTION

In view of the aforesaid issues, the primary object of the present invention is to provide a novel power adapter circuit configuration to improve total conversion efficiency.

The power adapter according to the present invention receives at least one AC input power and transforms to a DC primary output power. The power adapter includes a power factor correction circuit to receive the AC input power and modulate to become a modulated power, an isolation voltage step-down circuit connecting to the power factor correction circuit to modulate and lower the voltage of the modulated power to a modulated lower voltage power, a switch voltage regulation circuit connecting to the isolation voltage step-down circuit to receive the tightly regulated voltage power and a voltage stabilization circuit connecting to the switch voltage regulation circuit. The switch voltage regulation circuit sets a determined output level and modulates the modulated lower voltage power to become a determined power at the determined output level. The voltage stabilization circuit regulates the determined power to become the primary output power and supplies the primary output power to a primary output end, and modulates the level of the determined power according to alterations of the potential of the primary output end connecting to a load. The switch voltage regulation circuit is connected to a DC input end to receive a DC input power and modulates to become the determined power so that both AC and DC inputs are acceptable. A power adaptation circuit further is connected to the power factor correction circuit to receive the modulated power. A power adaptation circuit also is connected to the voltage stabilization circuit to transmit the modulated power to the voltage stabilization circuit to transform to the primary output power. The power adapter sets off the isolation voltage step-down circuit and the switch voltage regulation circuit during no load period. The voltage stabilization circuit receives the modulated power and transforms to the primary output power through the power adaptation circuit to reduce switch loss during a light load or no load period.

By means of the circuit set forth above, the switch loss during the no load period can be reduced, and total energy conversion improves.

The foregoing, as well as additional objects, features and advantages of the present invention will be more readily apparent from the following detailed description, which proceeds with reference to the accompanying drawings.

DETAILED DESCRIPTION OF THE PREFERRED EMBODIMENTS

Figure 1:
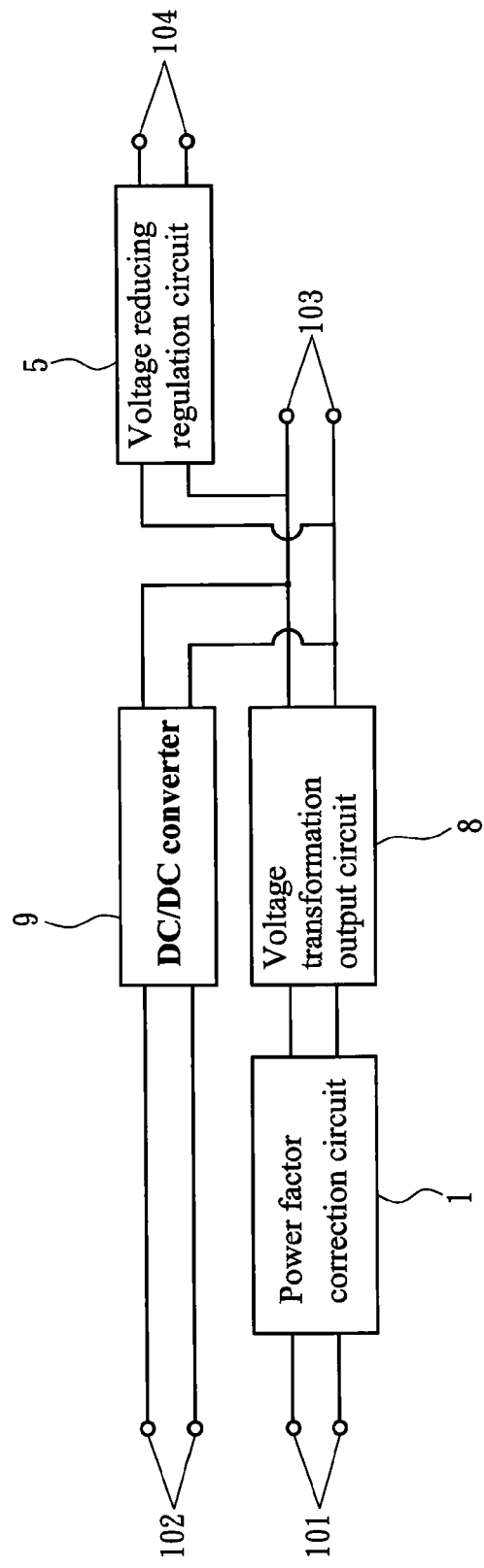
FIG. 1 is a circuit block diagram of a conventional power adapter.
Figure 2:
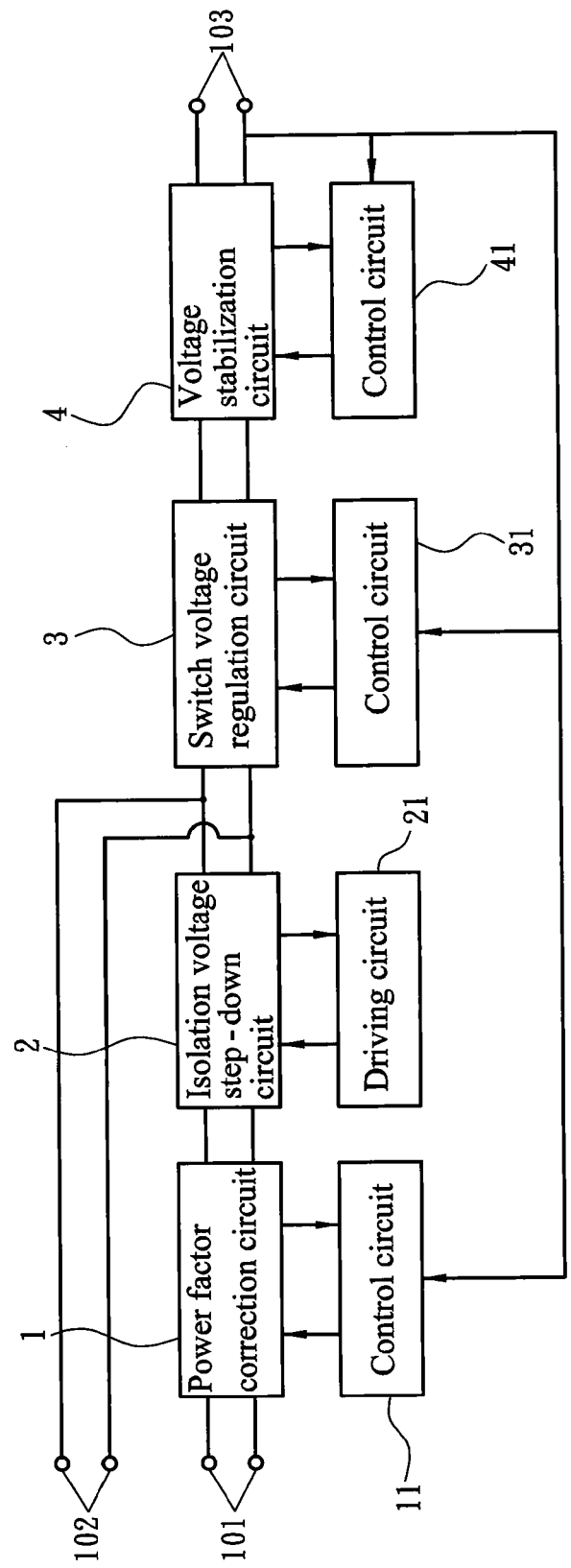
FIG. 2 is a basic circuit block diagram of the present invention.
Figure 3:
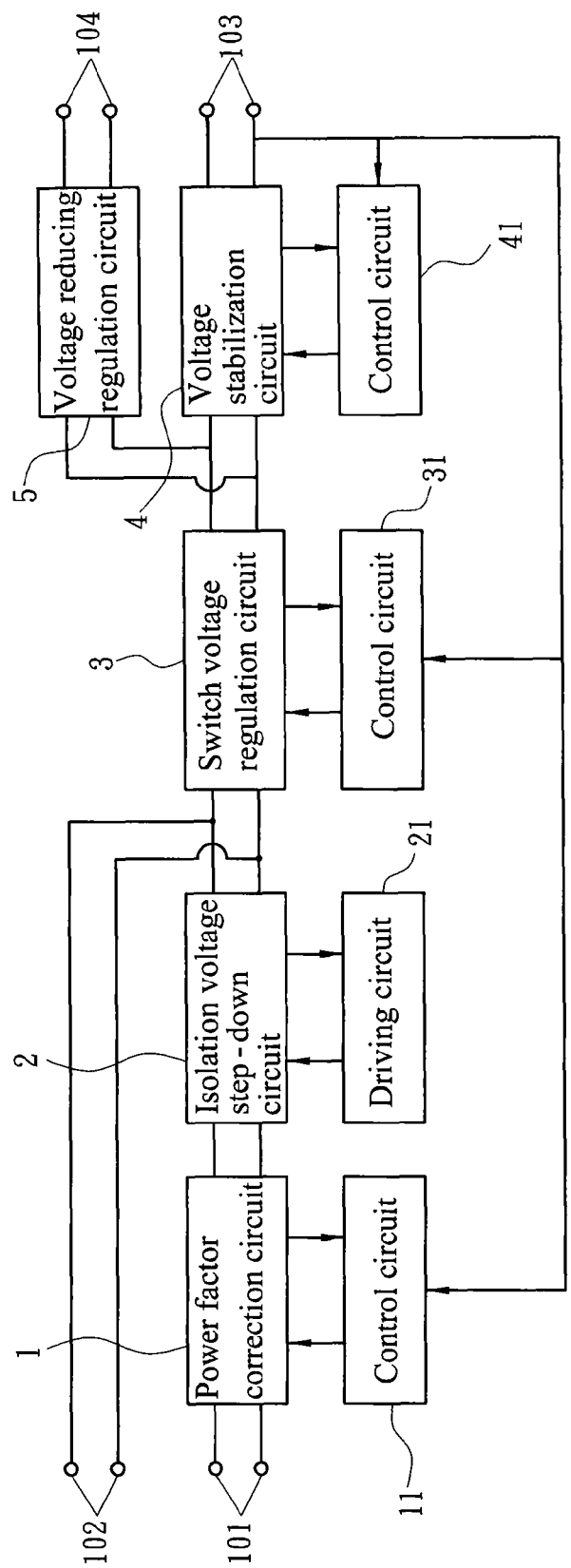
FIG. 3 is a preferable circuit block diagram of the present invention.

Please refer to FIG. 2 for the basic circuit configuration of the power adapter of the present invention. It aims to receive at least one AC input power and transform to a DC primary output power. The power adapter includes a power factor correction circuit 1 to receive the AC input power and modulate as a modulated power, an isolation voltage step-down circuit 2 connecting to the power factor correction circuit 1 to modulate the modulated power to a modulated lower voltage power, a switch voltage regulation circuit 3 connecting to the isolation voltage step-down circuit 2 and a voltage stabilization circuit 4 connecting to the switch voltage regulation circuit 3. The power factor correction circuit 1 is connected to an AC input end 101 to receive the AC input power and modulate the power factor of the AC input power to become the modulated power. The isolation voltage step-down circuit 2 receives the modulated power and is connected to a driving circuit 21 which provides a constant duty timing pulse to drive the isolation voltage step-down circuit 2 and modulate the modulated power to become the modulated lower voltage power at a lower potential. The switch voltage regulation circuit 3 is connected to the isolation voltage step-down circuit 2 to receive the modulated lower voltage power and also sets a determined output level, and modulates the modulated lower voltage power to become a determined power at the determined output level. The potential of the modulated lower voltage power is lower than the determined power. The power adapter further has a DC input end 102 coupled to the switch voltage regulation circuit in parallel with the isolation voltage step-down circuit 2. The DC input end 102 is connected to a DC power source when the AC input end 101 is disconnected to an AC power source to receive a DC input power and provide to the switch voltage regulation circuit 3 to regulate to become the determined power. Such a circuit configuration allows the power adapter to receive the AC or DC input power. The modulated power forms an intermediate power at a lower voltage through the isolation voltage step-down circuit 2 to be close to determined output voltage of the switch voltage regulation circuit 3 so that the switch voltage regulation circuit 3 can provide a higher conversion efficiency to transform the modulated lower voltage power or DC input power to become the determined power. The voltage stabilization circuit 4 is connected to the switch voltage regulation circuit 3 and driven by a control circuit 41 to regulate the determined power to become the primary output power, and sends the primary output power to a primary output end 103. The primary output end 103 has a main filter capacitor (coupling the primary output end 103 with a capacitor for filtering is a technique known in the art) located behind the voltage stabilization circuit 4 to limit an inrush current while the power adapter is activated to protect power semiconductor elements of the adapter. The power factor correction circuit 1, switch voltage regulation circuit 3 and voltage stabilization circuit 4 are connected respectively to a control circuit 11, 31 and 41 that generate a driving pulse. The control circuits 11, 31 and 41 are connected to the primary output end 103 to receive a feedback signal which is modulated to become the driving pulse to modulate and drive the duty timing of the power factor correction circuit 1, switch voltage regulation circuit 3 and voltage stabilization circuit 4. The control circuit 41 also has a detection and protection mode to prevent over-current or over-voltage. By judging whether the size of feedback signal is abnormal, output to the load can be cut off. Hence the voltage stabilization circuit 4 provides protection of the primary output from voltage and current overrun. It also accelerates instantaneous adjustment process of output voltage when the output load fluctuates temporarily. By means of the circuit configuration set forth above, the AC or DC input power can be transformed to the stable primary output power, and each circuit can function at its optimal operation point where the conversion efficiency is the maximum. Therefore total conversion efficiency of the power adapter can be enhanced. Moreover, as shown in FIG. 3, the switch voltage regulation circuit 3 and voltage stabilization circuit 4 may further be bridged by a voltage reducing regulation circuit 5 which receives the determined power and transforms to become a secondary output power. The secondary output power has a potential lower than the primary output power. Moreover, the voltage reducing regulation circuit 5 is connected to a low voltage output end 104 to deliver the secondary output power. Through conversion of the power factor correction circuit 1, isolation voltage step-down circuit 2 and switch voltage regulation circuit 3, the power adapter can generate the secondary output power at efficiency higher than the conventional circuit configurations.

Figure 4:
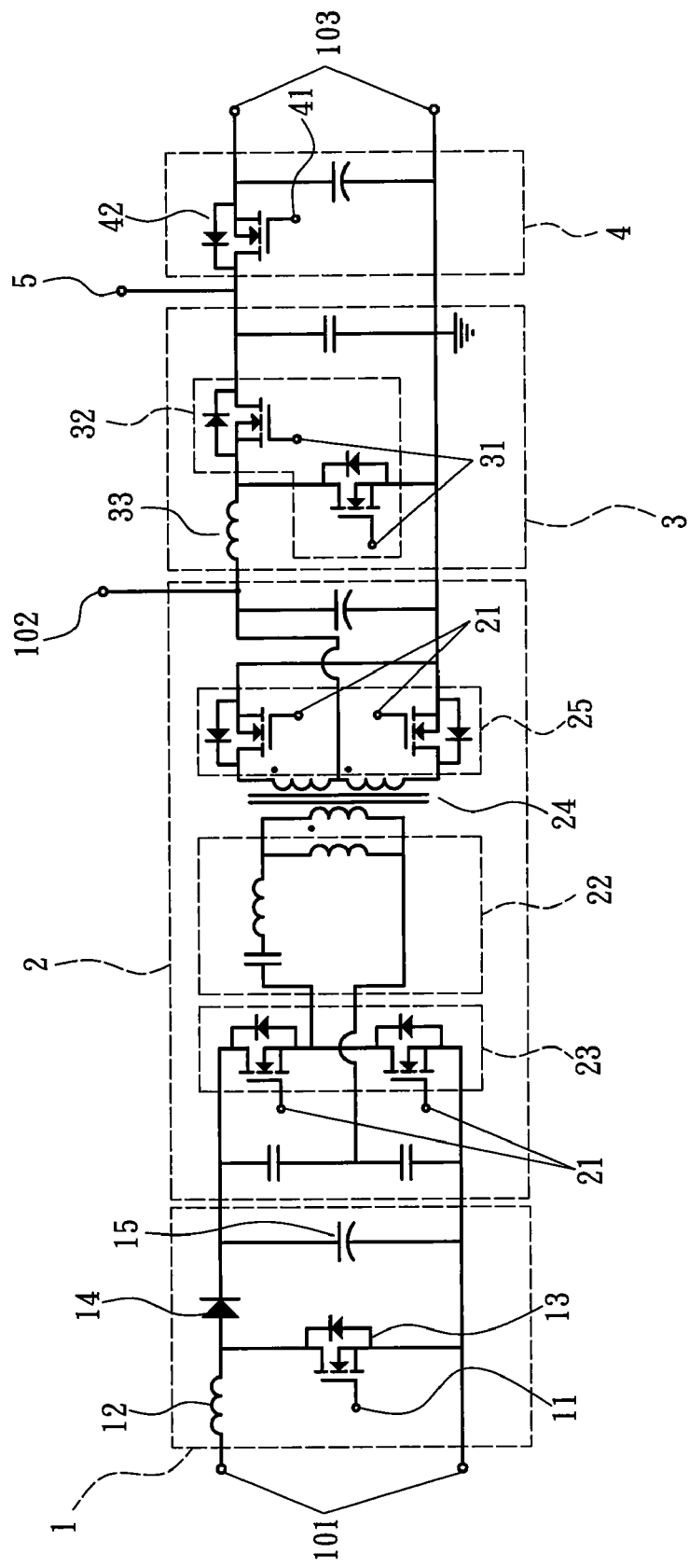
FIG. 4 is a circuit diagram of the embodiment according to FIG. 3.

Refer to FIG. 4 for the circuit diagram of an embodiment of the circuit configuration previously discussed. The power factor correction circuit 1 includes a voltage boosting inductor 12, a switch 13, a diode 14 and an energy saving capacitor 15. Through the control circuit 11 the power factor correction circuit 1 drives the ON time series of the switch 13 to modulate and generate the modulated power. The isolation voltage step-down circuit 2 includes a switch set 23 to switch the passing time series of the modulated power, a LLC resonant converter 22 connecting to the switch set 23 to receive the modulated power, a transformer 24 connecting to the LLC resonant converter 22 and a rectification switch set 25 connecting to the secondary side of the transformer 24. The driving circuit 21 provides a constant switching frequency to drive the switch set 23 and the rectification switch set 25 so that the LLC resonant converter 22 can function at a maximum efficiency. And through the transformer 24 power is sent to the secondary side to get power isolation effect. The rectification switch set 25 and the switch set 23 located on the transformer 24 operate at the same time to do regulation and generate the modulated lower voltage power. The switch voltage regulation circuit 3, through a switch set 32 driven by the control circuit 31 and an energy saving inductor 33, regulates the modulated lower voltage power to become the determined power. Moreover, the DC input end 102 bridges the switch voltage regulation circuit 3 and the isolation voltage step-down circuit 2. The voltage stabilization circuit 4 also modulates the voltage of the determined power through a switch 42. The voltage stabilization circuit 4 provides regulation in a limited range. It mainly aims to modulate voltage fluctuation of the primary output end 103 after connecting to the load to tightly stabilize the voltage. The voltage reducing regulation circuit 5 bridges the switch voltage regulation circuit 3 and the voltage stabilization circuit 4.

Figure 5:
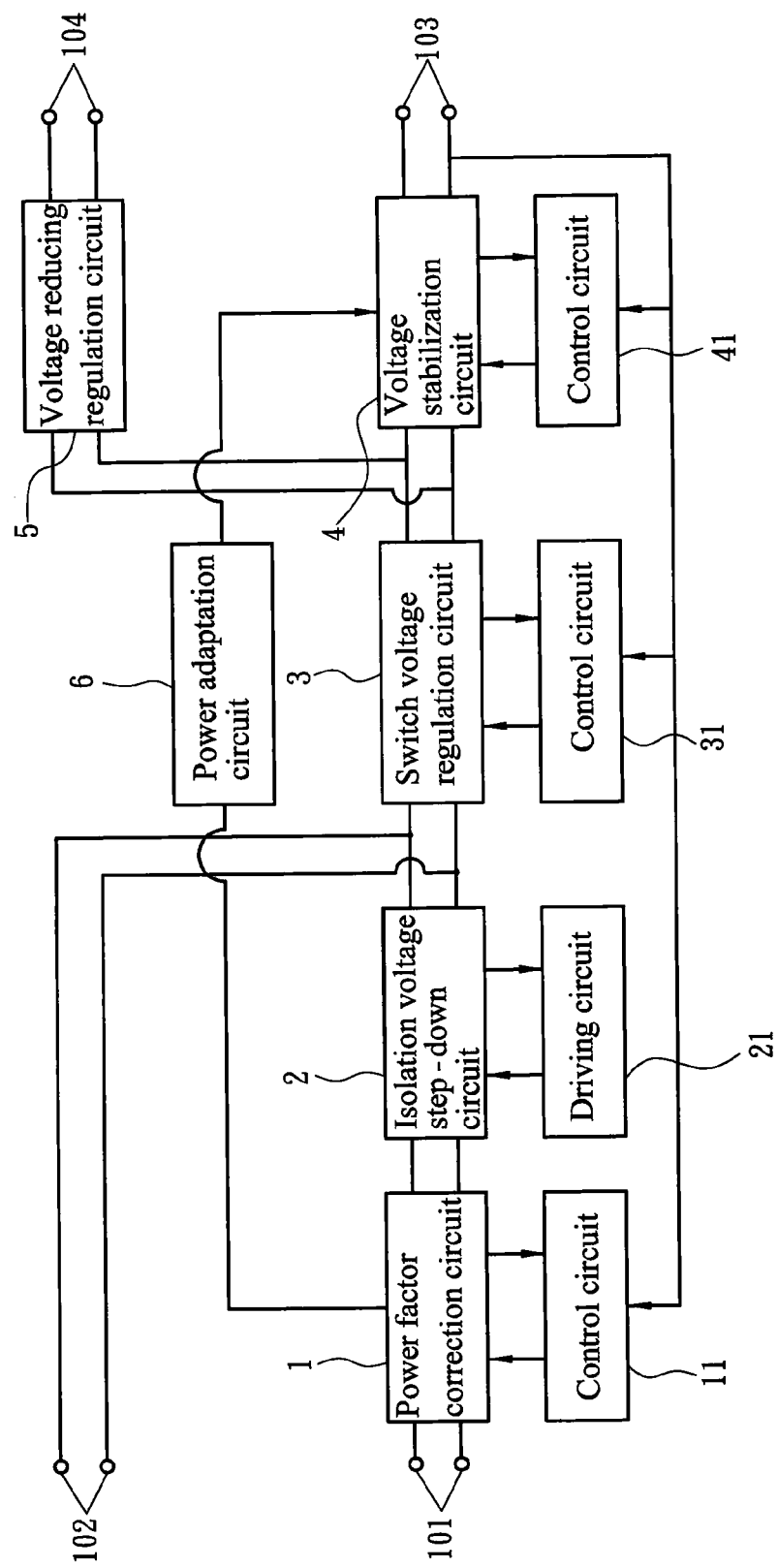
FIG. 5 is an optimal circuit configuration of the present invention.
Figure 6:
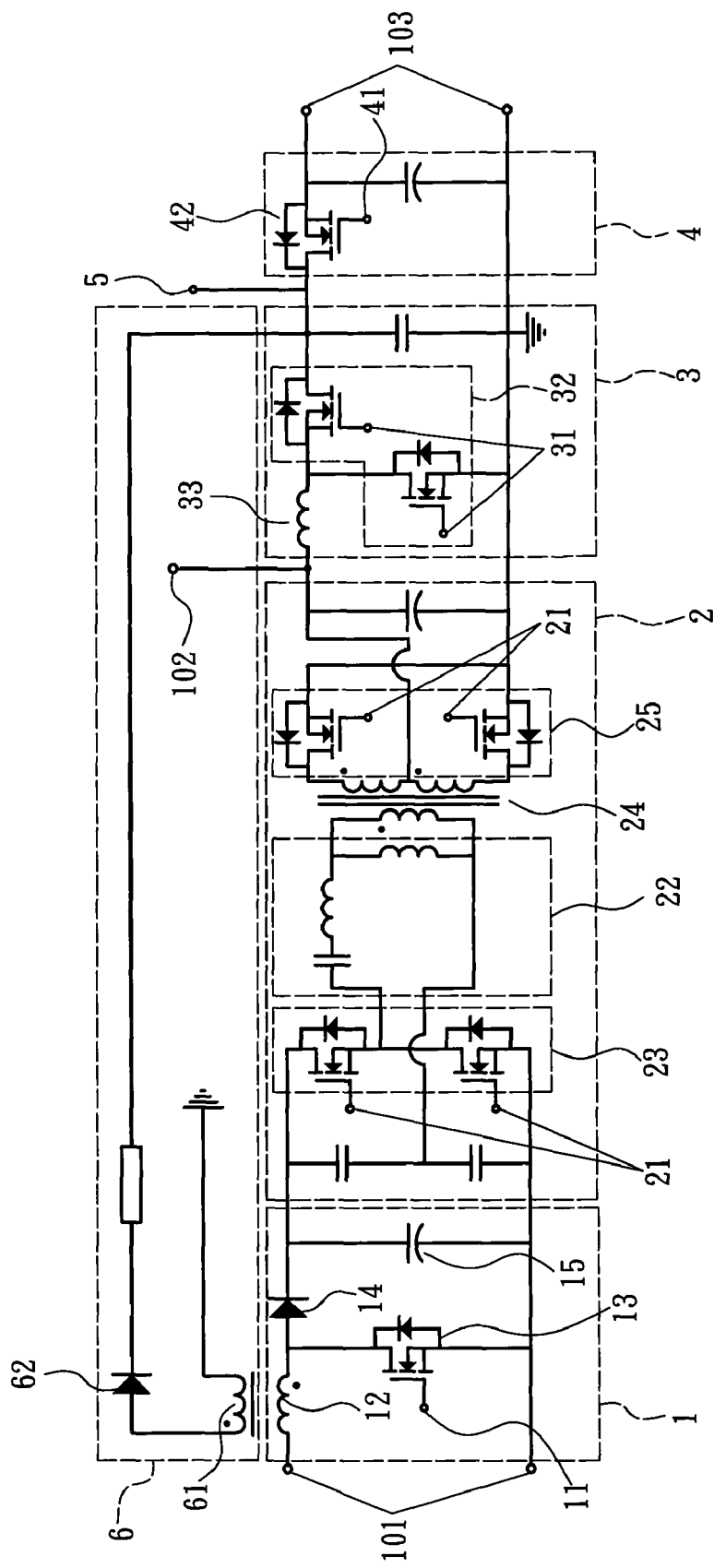
FIG. 6 is a circuit diagram of the embodiment according to FIG. 5.

Refer to FIG. 5 for an optimal circuit configuration of the present invention. The power factor correction circuit 1, isolation voltage step-down circuit 2, switch voltage regulation circuit 3, voltage stabilization circuit 4 and voltage reducing regulation circuit 5 are configured same as the one shown in FIG. 3. In order to reduce power consumption in the no load period, an operation mode to reduce circuit switch loss during the no load period has to be adopted. The present invention meets this purpose by providing a power adaptation circuit 6. The power factor correction circuit 1 is connected to the power adaptation circuit 6 to provide the modulated power. The power adaptation circuit 6 is connected to the voltage stabilization circuit 4 to transmit the modulated power and transform to the primary output power so that during a light load condition the switch voltage regulation circuit 3 and isolation voltage step-down circuit 2 stop operation. The modulated power generated by the power factor correction circuit 1 is transmitted to the voltage stabilization circuit 4 through the power adaptation circuit 6 to directly maintain output of the power adapter. Refer to FIG. 6 for an embodiment of the power adaptation circuit 6. The power adaptation circuit 6 includes an inductive coil 61 and a diode 62 connecting to the inductive coil 61. The diode 62 has an anode connecting to the inductive coil 61 and a cathode connecting to the voltage stabilization circuit 4. The inductive coil 61 and the voltage boosting inductor 12 of the power factor correction circuit 1 are coupled to induce the modulated power and transmit to the voltage stabilization circuit 4. By means of the circuit configuration set forth above the power adapter can significantly reduce the loss in the no load period to save energy.

Figure 7:
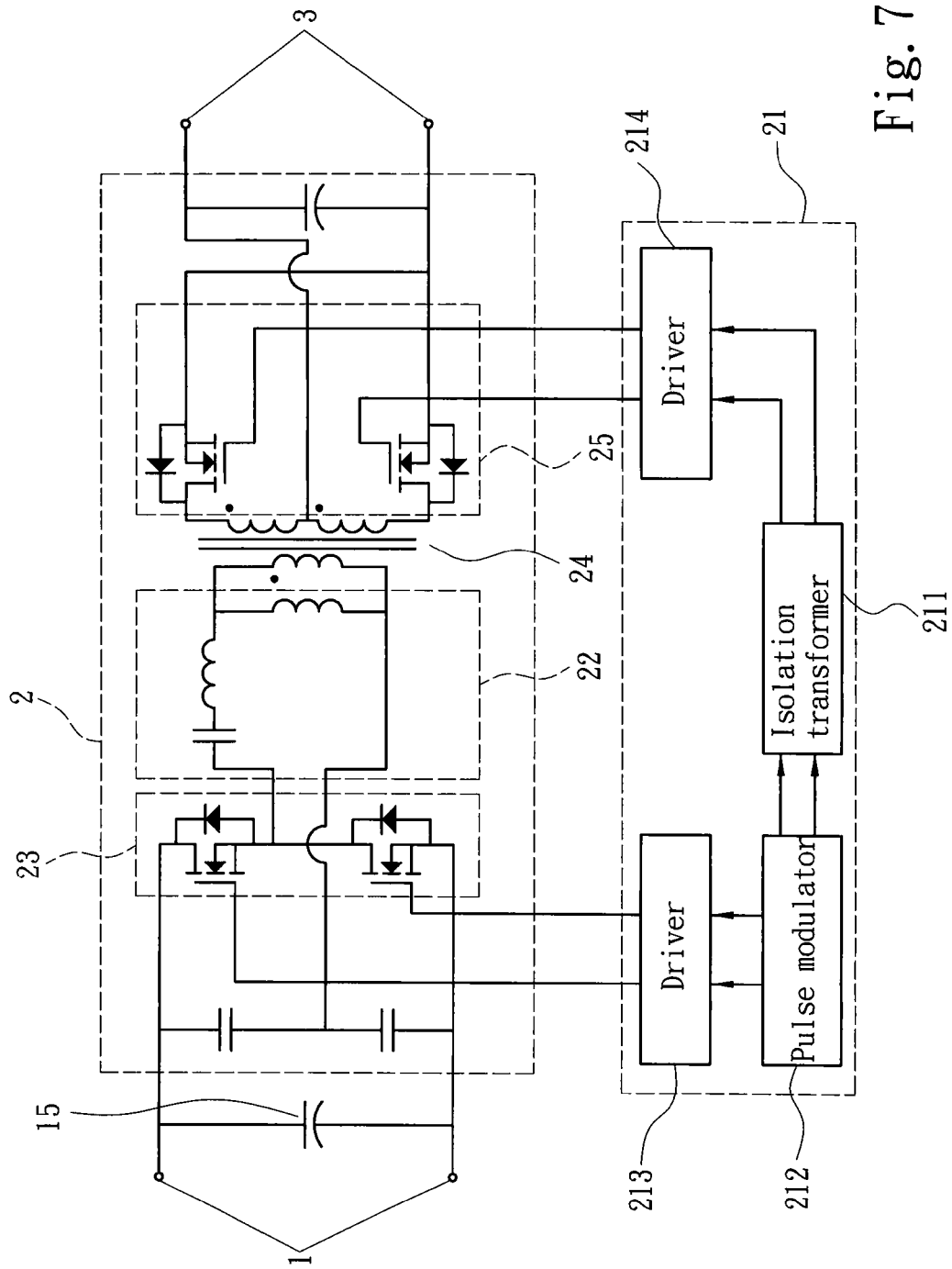
FIG. 7 is a circuit block diagram of an embodiment of the isolation voltage step-down circuit.
Figure 8:
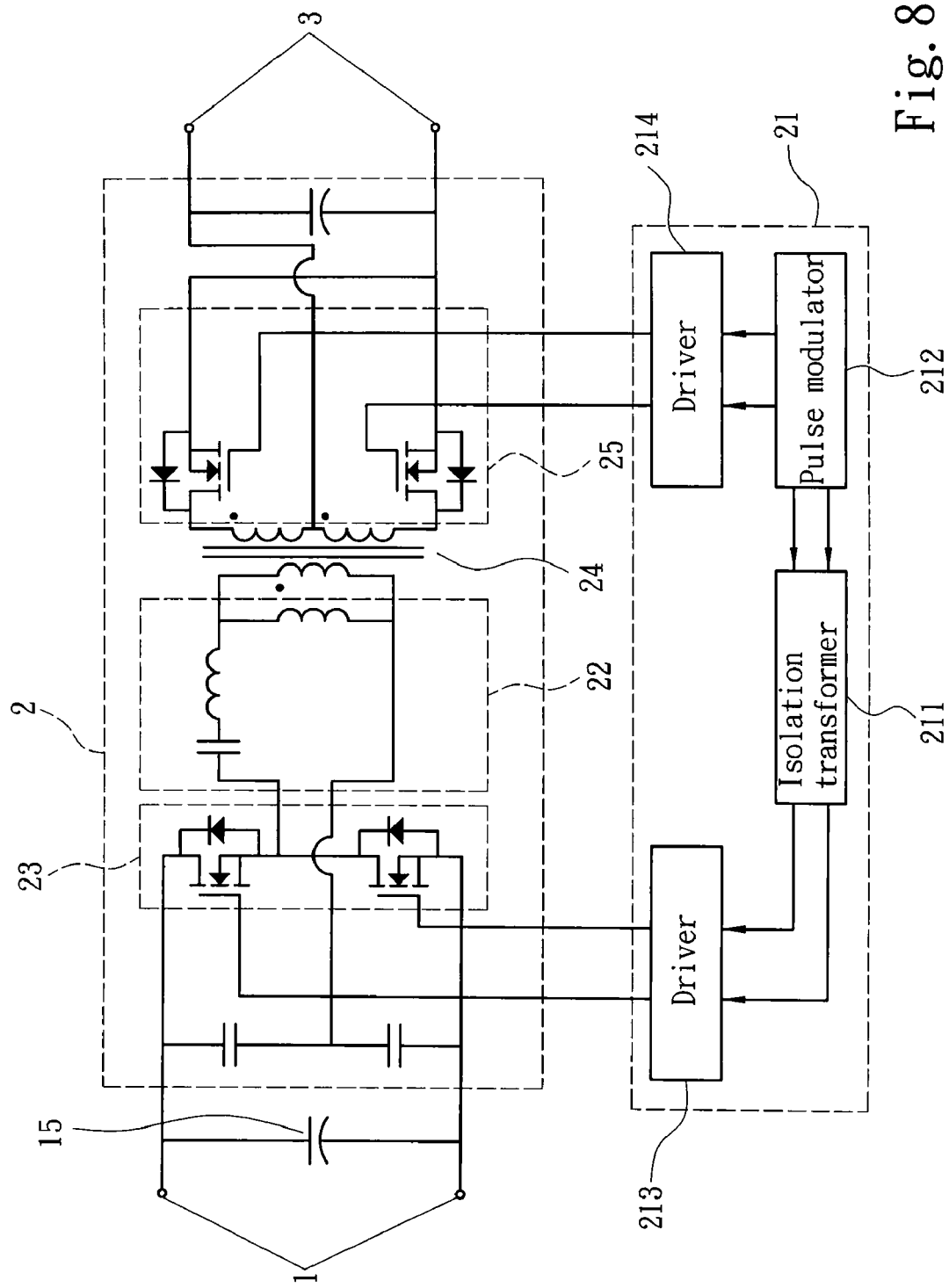
FIG. 8 is a circuit block diagram of another embodiment of the isolation voltage step-down circuit.

Refer to FIGS. 7 and 8 for the structure of the driving circuit 21 to control the isolation voltage step-down circuit 2. The driving circuit 21 includes an isolation transformer 211, a pulse modulator 212 connecting to a primary side or secondary side of the isolation transformer 211 and two drivers 213 and 214 connecting respectively to the switch set 23 and the rectification switch set 25. The pulse modulator 212 generates a switch pulse to directly drive or through the isolation transformer 211 to drive the switch set 23 and the rectification switch set 25 at the same time. Such a circuit design allows the pulse modulator 212 to be installed on the primary side or secondary side of the isolation transformer 211 according to requirements. The rectification switch set 25, by receiving the same switch pulse, can be synchronized with the switch set 23.

Through the embodiments previously discussed, each circuit can function at the optimum conversion efficiency to improve the total efficiency. Circuit loss in the no load period also is lower.

While the preferred embodiments of the present invention have been set forth for the purpose of disclosure, modifications of the disclosed embodiments of the present invention as well as other embodiments thereof may occur to those skilled in the art. Accordingly, the appended claims are intended to cover all embodiments which do not depart from the spirit and scope of the present invention.

What is claimed is:

1. A power adapter to receive at least one input power and transform to DC primary output power, comprising:
   a power factor correction circuit connecting to an AC input end to receive an AC input power and modulating the power factor of the AC input power to deliver a modulated power;
   an isolation voltage step-down circuit connecting to the power factor correction circuit to receive the modulated power and modulating the modulated power to a lower voltage to deliver a modulated lower voltage power;
   a switch voltage regulation circuit connecting to the isolation voltage step-down circuit to receive the modulated lower voltage power and having a determined output level to transform the modulated lower voltage power to output a determined power;
   a voltage stabilization circuit connecting to the switch voltage regulation circuit to modulate the determined power to become the primary output power sent to a primary output end and receive potential alterations of the primary output end and modulate the potential of the primary output power; and
   a power adaptation circuit, coupled between the power factor correction circuit and the voltage stabilization circuit;
   wherein when the power adapter is under a first operation mode, the power factor correction circuit, the isolation voltage step-down circuit, the switch voltage regulation circuit and the voltage stabilization circuit are operative to generate the primary output power; and when the power adapter is under a second operation mode, the isolation voltage step-down circuit and the switch voltage regulation circuit stop operations, and the power factor correction circuit transmits the modulated power to the voltage stabilization circuit through the power adaptation circuit to maintain an output of the power adapter.

2. The power adapter of claim 1 further comprising a DC input end coupled to the switch voltage regulation circuit in parallel with an output end of the isolation voltage step-down circuit, the DC input end being connected to a DC power source when the AC input end is disconnected to the AC power source to channel a DC input power to the switch voltage regulation circuit to regulate as the determined power.

3. The power adapter of claim 2, wherein the switch voltage regulation circuit and the voltage stabilization circuit are bridged by a voltage reducing regulation circuit to receive the determined power and transform to a secondary output power which has a potential lower than the primary output power, the voltage reducing regulation circuit being connected to a low voltage output end to deliver the secondary output power.

4. The power adapter of claim 2, wherein the power factor correction circuit, the switch voltage regulation circuit and the voltage stabilization circuit are connected respectively to a control circuit to generate a driving pulse, the control circuits being connected to the primary output end to receive a feedback signal to modulate the driving pulse.

5. The power adapter of claim 2, wherein the isolation voltage step-down circuit is connected to a driving circuit which provides a constant duty timing pulse to drive the isolation voltage step-down circuit.

6. The power adapter of claim 5, wherein the isolation voltage step-down circuit has a switch set to switch passing timing of the modulated power, a LLC resonant converter connecting to the switch set to receive the modulated power, a transformer connecting to the LLC resonant converter and a rectification switch set connecting to a secondary side of the transformer, the driving circuit providing the constant duty timing pulse to drive the switch set and the rectification switch set.

7. The power adapter of claim 6, wherein the driving circuit includes an isolation transformer, a pulse modulator connecting to a primary side or a secondary side of the isolation transformer and two drivers connecting respectively to the switch set and the rectification switch set, the pulse modulator generating a switch pulse to directly drive the switch set and the rectification switch set concurrently or drive the switch set and the rectification switch set concurrently through the isolation transformer.

8. The power adapter of claim 1, wherein the power adaptation circuit includes an inductive coil and a diode connecting to the inductive coil, the diode having an anode connecting to the inductive coil and a cathode connecting to the voltage stabilization circuit, the inductive coil being coupled with a voltage boosting inductor of the power factor correction circuit to induce the modulated power and transmit to the voltage stabilization circuit.

9. The power adapter of claim 1, wherein the switch voltage regulation circuit and the voltage stabilization circuit are bridged by a voltage reducing regulation circuit which receives the determined power and transforms to become a secondary output power at a potential lower than the primary output power, the voltage reducing regulation circuit being connected to a low voltage output end to deliver the secondary output power.

10. The power adapter of claim 1, wherein the power factor correction circuit, the switch voltage regulation circuit and the voltage stabilization circuit are connected respectively to a control circuit to generate a driving pulse, the control circuits being connected to the primary output end to receive a feedback signal to modulate the driving pulse.

11. The power adapter of claim 1, wherein the isolation voltage step-down circuit is connected to a driving circuit which provides a constant duty timing pulse to drive the isolation voltage step-down circuit.

12. The power adapter of claim 11, wherein the isolation voltage step-down circuit has a switch set to switch passing timing of the modulated power, a LLC resonant converter connecting to the switch set to receive the modulated power, a transformer connecting to the LLC resonant converter and a rectification switch set connecting to a secondary side of the transformer, the driving circuit providing the constant duty timing pulse to drive the switch set and the rectification switch set.

13. The power adapter of claim 12, wherein the driving circuit includes an isolation transformer, a pulse modulator connecting to a primary side or a secondary side of the isolation transformer and two drivers connecting respectively to the switch set and the rectification switch set, the pulse modulator generating a switch pulse to directly drive the switch set and the rectification switch set concurrently or drive the switch set and the rectification switch set concurrently through the isolation transformer.

* * * * *